United States Patent [19]

Bravet et al.

[11] Patent Number: 5,082,736
[45] Date of Patent: Jan. 21, 1992

[54] ENCAPSULATED WINDOW GLASS, READY FOR INSTALLATION, AND A METHOD FOR ITS PRODUCTION

[75] Inventors: Jean-Louis Bravet, Thourotte; Gerard Daude, Villenave D'Ornon, both of France

[73] Assignee: Saint-Gobain Vitrage International, Courbevoie, France

[21] Appl. No.: 464,004

[22] Filed: Jan. 12, 1990

[30] Foreign Application Priority Data

Jan. 12, 1989 [FR] France .................. 89 00290

[51] Int. Cl.$^5$ .................. B32B 27/38; B32B 27/40
[52] U.S. Cl. .................. 428/425.6; 428/343; 428/417; 428/420; 428/423.1
[58] Field of Search .................. 428/423.1, 425.6, 426, 428/343, 346, 349, 420, 417

[56] References Cited

U.S. PATENT DOCUMENTS 4,789,600 12/1988 Triebs et al. .................. 428/425.6

Primary Examiner—Merrell C. Cashion, Jr.
Assistant Examiner—D. S. Nakarani
Attorney, Agent, or Firm—Oblon, Spivak, McClelland, Maier & Neustadt

[57] ABSTRACT

The invention relates to a molded window glass intended to be installed by gluing it into a window opening, especially a window opening in a car.

The molded profile has at least one reactive surface comprising free OH groups which can subsequently react with the strip of adhesive used for installation of the window glass in the window opening by gluing.

10 Claims, No Drawings

ENCAPSULATED WINDOW GLASS, READY FOR INSTALLATION, AND A METHOD FOR ITS PRODUCTION

BACKGROUND OF THE INVENTION

1. Field of the Invention

The invention relates to encapsulated window glass, ready for installation by gluing it into a window opening of a car body.

2. Discussion of Background

Installation of window glass for motor vehicles by gluing it into a window opening of the car body presents several advantages. In particular: it allows the window glass to be held in the window opening of the car body in case of violent shock, it can be automated, it permits flush installation of the window glass in the car body, which reduces the coefficient of air resistance of the vehicle.

In the case of installation of a solid or laminated window glass without a molded profile, gluing of the window glass into the window opening of the car body is accomplished by depositing a strip of suitable adhesive on an enamelled edging provided on the periphery of the face of the window glass directed towards the inside of the car. This enamelled edging is particularly intended to protect the adhesive from UV radiation which can alter its properties, and also plays an esthetic role, by hiding the unattractive glue joint from view.

In the case of an encapsulated window glass, in other words a window glass equipped with a molded peripheral profile (or encapsulation joint), particularly intended to replace the finish joint, installation of the window glass by gluing can be accomplished as for the preceding type of window glass, by placing glue on the glass or an enamelled edging at the edge of the molded profile. In one variation, the glue can be placed directly on the molded profile. But in this variation, the gluing effect obtained with seams of known glue is not satisfactory, and the adhesion forces are generally insufficient or not maintained over time.

This poor adhesion is particularly due, without a doubt, to the presence, on the molded profile, of a residue of the unmolding product generally used during production of an RIM (reactive injection molding) encapsulation joint, in order to prevent the molded profile from becoming glued to the mold during the course of its production. When the encapsulated window glass is removed from the mold, some unn...lding product remains on the profile, and even cleaning with various types of solvents does not make it possible to obtain satisfactory gluing properties.

SUMMARY OF THE INVENTION

The invention provides an encapsulated window glass, ready to be installed, which is suitable for gluing and meets safety standards for window glass.

The window glass, according to the invention, is a solid or laminated window glass comprising a molded profile (or encapsulation joint) on its periphery, one face of which is intended to be glued into a window opening of a car body, such as the window opening of the body of a motor vehicle, for example, by the intermediary of a strip of adhesive, the face being reactive and presenting free OH groups, which are able to subsequently react with the strip of adhesive used for installation of the window glass in the window opening. The invention particularly relates to a window glass equipped with a molded profile with a polyurethane base. The molded profile can be obtained by RIM or by thermoplastic injection.

DETAILED DESCRIPTION OF THE PREFERRED EMBODIMENTS

Under one of the aspects of the invention, the face is made reactive by treatment, after molding, using a treatment compound essentially comprising components which can form a layer of free OH groups.

The treatment compound can comprise base components to form a polyurethane with free OH groups, the polyol component being taken in excess, in terms of equivalents relative to the isocyanate component, the ratio of NCO groups to OH groups being less than 1, preferably between 0.3 and 0.99.

In one variation, the treatment compound can be a compound comprising an epoxy resin with two components.

In another variation, the treatment compound can have a polyoxasolidone resin base obtained by condensation of an isocyanate on an epoxy resin in excess, in the presence of a catalyst of the quaternary ammonium salt type.

The isocyanate component can be chosen from among difunctional aliphatic or aromatic isocyanates such as hexamethylene diisocyanate, 2,2,4-trimethyl-1-1,6-hexamethylene diisocyanate, bis (4-isocyanatocyclohexyl) methane, isocyanato 1, 3-isocyanatomethyl-3,5,5-trimethyl cyclohexane (IPDI), toluylene diisocyanate (TDI), isocyanates with a functionality greater than 2, such as isocyanate biurets, isocyanurates, partially polymerized diisocyanatodiphenyl methane, with a functionality between 2 and 3, etc.

The polyol component can be formed of at least one polyol chosen from among the long polyols with a molecular weight between approximately 400 to 4000, such as polyether diols, polyester diols, polycaprolactone diols.

Advantageously, the polyol component comprises at least one long polyol as cited above, and at least one diol with a lower molecular weight, chosen from among those generally used as chain lengtheners in the preparation of polyurethanes: for example, the following can be cited: ethylene glycol, propanediol-1,2, propanediol-1,3, butanediol-1,2, -1,3, -1,4, dimethyl-2,2-propanediol-1,3 (neopentyl glycol), pentanediol-1,5, hexanediol-1,6, octanediol-1,8, decanediol-1,10, dodecanediol-1-12, cyclohexane dimethanol, bisphenol A, methyl-2-pentanediol-2,4, methyl-3 pentanediol-2,4, ethyl-2-hexanediol-1,3, trimethyl-2,2,4-pentanediol-1,3, diethylene glycol, triethylene glycol, tetraethylene glycol, butyne-2-diol-1,4, butenediol-1,4 and decyne diol, substituted and/or etherified, hydroquinone-bishydorxyethyl ether, bisphenol A etherified by two or four groups of prophylene oxide, dimethylol propionic acid.

The polyol component can also be formed of a polyol with a functionality greater than two, such as aliphatic monomer triols with polyether chains, polycaprolactone triols, the molecular weight of these triols generally being comprised between 90 and 1000, mixed polyether/polyester triols with a functionality greater than 2, for example a functionally between 2 and 3.

The polyol with a functionality greater than 2 can be used alone, particularly if its molecular weight is greater than approximately 400. In one variation, it can be used in a mixture with at least one long difunctional polyol and/or with at least one short diol.

One of the essential characteristics of the invention is the excess of OH groups on the treatment compound. These OH groups in excess must be stable, in other words they must remain reactive during storage, even extended storage, in order to later be able to react with the free NCO groups of the adhesive joint, generally a joint of polyurethane which is not entirely polymerized at the time it is put into place.

The invention also relates to a method of production of a molded window glass demonstrating an aptitude for improved gluing for installation by gluing it into a window opening of a car body.

The method according to the invention consists of treating at least one face of the molded joint intended to receive the strip of glue, using a compound which is capable of giving this face free OH groups which can react with the glue joint at the time of installation of the window glass in the window opening of the car body. For this purpose, a compound which is a mixture of reactive components comprising OH groups in excess is deposited on the said face, and the layer deposited as polymerized, at least partially. The reactive mixture applied can comprise monomers or polymers which are capable of forming a polyurethane with free OH groups after polymerization. In one variation, the reactive mixture can comprise an epoxy resin with two components. The reactive mixture can be applied in the form of a solution in a solvent, in order to facilitate the application.

Polymerization can be carried out by thermal treatment at an elevated temperature, with short duration, for example at a temperature of approximately 80° to 120° C., for a duration on the order of 1 minute to several minutes. It can also be carried out at so-called room temperature, in other words approximately 20° to 25° C., for a much longer duration, for example 24 hours. Between these two types of polymerization, any other cycle of thermal polymerization can also be envisaged. The advantage of rapid polymerization essentially rests in greater ease of manipulation of the treated window glass. Also, as applicable, other types of polymerization can be used, for example by microwaves, by catalysts in the vapor phase, by radiation, etc.

In a preferred form of the invention, pretreatment of the face of the molded profile to be treated is carried out.

This pretreatment can be carried out once or several times, using a solvent, and has the particular purpose of eliminating the unmolding product used during the course of the molding process of the joint at least partially from the said face. The solvent used for pretreatment can be chosen particularly from among chlorinated solvents, essence of terebenethine, white spirit, pentane, tetrahydrofurane (THF), etc., alone or in a mixture. Preferably, chlorinated solvents are chosen, such as dichloromethane, trichloro-1,1,1-ethane.

Other characteristics and advantages of the invention will be evident from the following description of examples of window glass and treatments in accordance with the invention.

EXAMPLE 1

An encapsulated window glass for an automobile, for example for a small side window, is produced by the process of reactive injection molding (known as the RIM process), in other words a process in which the molding material injected is a reactive mixture which reacts and hardens in the mold. The product used is, for example, a mixture of components which can form a profile or joint of polyurethane. For this purpose, the glass window is placed into a mold, the corresponding profile part of which is first coated with an unmolding agent, specifically a polyethylene wax. After production of the molded profile on the window glass, the encapsulated window glass is unmolded and the surface of the molded joint, at least the face intended to be glued into the window opening of the car body, using a strip of glue, is treated using trichloro-1,1,1-ethane.

After being allowed to dry for several minutes at room temperature, a compound prepared in advance by mixing an isocyanate component: partially polymerized methylene diphenyl diisocyanate with a functionality between 2 and 3, a polyol component comprising polypropylene glycol with a molecular weight of 440 and butane diol-1,4, is applied to the cleaned and dried face, using a felt pad.

The components are used in quantities such that 1 equivalent OH, of which 0.3 equivalent comes from polypropylene glycol and 0.7 equivalent comes from butane diol-1,4, corresponds to 0.8 equivalent of isocyanate.

To produce this reactive compound, 32.7 g polypropylene glycol is mixed with 15.3 g butane diol-1,4. Methyl ethyl acetone is added to have a final polyurethane concentration of approximately 20%. The concentration depends on the thickness which one wishes to deposit on the face of the molding joint. To the aforementioned mixture, 0.3 g of a catalyst, for example dibutyl tin dilaurate (DBTL), is added. Then 52 g partially polymerized methylene diphenyl diisocyanate is added.

The reactive mixture is spread onto the molded joint using a felt pad. After spreading, polymerization is carried out by heating in an enclosure, to 120° C., which results in a skin temperature of approximately 85° C. for approximately 5 minutes. The thickness of the layer is approximately 15 to 20 um.

The encapsulated window thus obtained is fit into the opening of a car body by gluing. This suitability for gluing is maintained even after extended storage of the window glass. The strip of adhesive used for gluing can be any strip of adhesive used for direct gluing of glass or of an enamelled edging of the window opening of the car body. For example, a polyurethane strip or mastic with two or components, or a polyurethane strip or mastic with a component which hardens in humidity can be mentioned.

The adhesion obtained between the molded profile of the window glass and the adhesive is strong and durable.

This adhesion can be evaluated using a peeling test on a test element comprised of a strip of the material forming the encapsulation profile, 2 cm wide, which is deposited and made to harden by polymerization on the strip of adhesive, with the same width, used for installation of the window glass in window opening of the car body by gluing. The strip of adhesive used is a commercial joint compound called BETAESEAL HV3. The strip of adhesive is deposited on the molded profile treated according to the invention, in one case immediately after the treatment, and in another case, 7 days later.

The measurements of adhesion by peeling the test elements at 180° are carried out immediately after hardening under normal conditions for mastic glue, which is 7 days in this case.

The adhesion obtained is Ho. The adhesion is also measured after another 7 days under conditions of applying a wet dressing, conditions known according to the test method RENAULT 1165 H7.

Generally, a cohesive rupture of the strip of adhesive is sought, with values at least equal to 60N/cm for $H_o$ and at least equal to 40 N/cm for $H_7$.

The values measured for Example 1 are:
$H_0$ = 94 to 110N/cm
$H_7$ = 65N/cm on the average, with a cohesive rupture of the strip of adhesive.

COMPARISON EXAMPLES

A molded window glass is produced as in Example 1. However, after unmolding of the encapsulated window glass, only pretreatment of the face of the profile to be glued, with one or several solvents as described below, is carried out, in other words there is no treatment of the face using a reactive compound.

COMPARISON EXAMPLE 1

The face is cleaned several times with trichloro-1,1,1-ethane. The values obtained, measured under the conditions described above, are $H_0$ = 22N/cm with adhesive rupture.

COMPARISON EXAMPLE 2

The face is cleaned with pentane. The value for $H_0$ obtained is 23N/cm with adhesive rupture.

COMPARISON EXAMPLE 3

The face is cleaned with white spirit. The value for $H_0$ obtained is 12N/cm with adhesive rupture.

COMPARISON EXAMPLE 4

The face is cleaned with a mixture of equal parts of dichloromethane, acetone, THF and butylene oxide. The value for $H_0$ obtained is 16N/cm with adhesive rupture.

The values obtained after treatment only with a solvent or a solvent mixture are therefore not satisfactory.

EXAMPLE 2

Work is carried out as in Example 1, except that the molded profile is not first treated with a solvent, but rather only with the reactive mixture as in Example 1. After heating for 5 minutes at 120° C, a value for $H_0$ is obtained that is generally better than after treatment with a solvent alone, but is very varied among the samples, between 20 and 65N/cm.

The type of rupture also varies among the samples, from adhesive rupture to cohesive rupture.

EXAMPLE 3

Work is carried out as in Example 1, except that the molded profile is first treated with pentane. A value for $H_0$ = 60 and $H_7$ between 20 and 45N/cm is obtained. The type of rupture varies among the samples, from adhesive rupture to cohesive rupture.

Pretreatment with pentane is less effective than with a chlorinated solvent.

EXAMPLE 4

Work is carried out as in Example 1, except that the molded profile is first cleaned with dichloromethane. The adhesion values obtained are $H_0$ = 100N/cm and $H_7$ = 48N/cm, with cohesive rupture of the strip of glue.

EXAMPLE 5

Work is carried out as in Example 1, except that the molded profile is treated with a reactive mixture with an epoxy resin base, with two components, specifically a commercial resin called EPIKOTE 928, sold by SHELL, in the ratio of one part, and a commercial resin called QUICK CURE 195 x, sold by CRAYVALLEY, in a ratio of two parts, in a solution of ethyl methyl acetone.

The resin is polymerized by thermal treatment for 10 minutes at 100° C. The thickness of the layer deposited varies between 15 and 20 um. The adhesion values obtained are the following: $H_0$ equal to 96N/cm and $H_7$ equal to 50N/cm.

EXAMPLE 6

Work is carried out as in Example 5, except that the molded profile is not first treated with a solvent, but rather only with the reactive mixture as in Example 5.

The adhesion values measured are: $H_0$ between 15 and 65N/cm, varying among the samples, which is generally insufficient.

EXAMPLE 7

Work is carried out as in Example 5, except that the molded profile is first treated with pentane. The adhesion values obtained are: $H_0$ equal to 80N/cm and $H_7$ equal to 40N/cm, with cohesive rupture.

EXAMPLE 8

Work is carried out as in Example 5, except that the molded profile is first treated with dichloromethane. The adhesion values obtained are: $H_0$ equal to 90N/cm and $H_7$ equal to 60N/cm, with cohesive rupture.

EXAMPLE 9

Work is carried out as in Example 1, except that the polyol component is modified using polytetramethylene glycol with a molecular weight of 650 for this component, the ratio of NCO/OH groups remaining at 0.8.

The adhesion values obtained are: $H_0$ equal to 70N/cm and $H_7$ equal to 40N/cm, with cohesive rupture.

EXAMPLE 10

Work is carried out as in Example 1, except that as the polyol component, a polyol with a functionality greater than 2, specifically a polypropylene glycol with a functionality of 3 and a molecular weight of approximately 550 is used.

The adhesion values obtained are: $H_0$ equal to 75N/cm and $H_7$ equal to 45N/cm, with cohesive rupture.

EXAMPLE 11

Work is carried out as in Example 1, with the same components, except that the ratio between the two is modified to have a ratio of NCO/OH of 0.4.

The adhesion values obtained are: $H_0$ to 60N/cm and $H_7$ equal to 60N/cm.

EXAMPLE 12

Work is carried out as in Example 1, except that the ratio of the components is modified to have a ratio of NCO/OH of 0.95.

The adhesion values obtained are: $H_0$ equal to 80N/cm and $H_7$ equal to 55N/cm.

EXAMPLE 13

Work is carried out as in Example 1, except that the ratio of the components is modified to have a ratio of NCO/OH of 0.99.

The adhesion values obtained are: $H_0$ equal to 75N/cm and $H_7$ equal to 55N/cm.

COMPARISON EXAMPLE 5

Work is carried out as in Example 1, except that the ratio of the components is modified to have a ratio of NCO/OH of 1.

If the strip of adhesive is deposited immediately after treatment of the encapsulation profile, the adhesion values obtained for $H_0$ and $H_7$ are satisfactory. However, if the strip of adhesive is deposited 7 days after the treatment, as in the other examples, the value obtained for $H_0$ is satisfactory, but $H_7$ is insufficient, being equal to 10–15N/cm. The adhesion is not maintained over time.

COMPARISON EXAMPLE 6

Work is carried out as in Example 1, except that the ratio of the components is modified to have a ratio of NCO/OH of 1.1.

As in comparison Example 5, the adhesion is not maintained over time, even if the strip of adhesive is deposited on the molded profile only 24 hours later.

COMPARISON EXAMPLE 7

Work is carried out as in Example 1, except that no treatment of the encapsulation profile is carried out. The value obtained for $H_0$ is only 10N/cm.

EXAMPLE 14

An encapsulated window glass is produced by the process of thermoplastic injection molding of a polyurethane known for this type of application.

Then work is carried out as in Example 1.

The adhesion values obtained are $H_0$ equal to 70 and $H_7$ equal to 60, with a cohesive rupture.

EXAMPLE 15

Work is carried out as in Example 1, except that the thermal polymerization treatment of the compound deposited on the molded profile is replaced with so-called room temperature polymerization, which consists of allowing the compound to react on the window glass at 23° C. for 24 hours.

The adhesion values obtained are $H_0$ equal to 90N/cm and $H_7$ equal to 60N/cm.

Obviously, numerous modifications and variations of the present invention are possible in light of the above teachings. It is therefore to be understood that within the scope of the appended claims, the invention may be practiced otherwise than as specifically described herein.

We claim:

1. A solid or laminated window glass equipped with a molded peripheral profile, intended to be installed in a window opening by gluing, wherein the molded profile presents at last one reactive face comprising free OH groups which are able to subsequently react with a strip of adhesive used for installation of the window glass in said window opening.

2. A window glass according to claim 1, wherein the reactive face is obtained by treatment using a reactive treatment compound comprising a polyol component and an isocyanate component which can form a polyurethane with free HO groups.

3. A window glass according to claim 2, wherein the reactive treatment compound is formed with an isocyanate component and a polyol component, the ratio of NCO groups to OH groups being less than 1.

4. A window glass according to claim 3, wherein said ratio is between 0.3 and 0.99.

5. A window glass according to claim 3, wherein the polyol component comprises a polyol with a functionally greater than 2.

6. A window glass according to claim 2, wherein the isocyanate component is methylene diphenyl diisocyanate based.

7. A window glass according to claim 1, wherein the reactive face is obtained by treatment using a reactive treatment compound comprising components which can form an epoxy resin with free OH groups.

8. A window glass according to claim 1, wherein before the treatment using the reactive treatment compound, the face of the molded profile is first treated, at least once, with a solvent.

9. A window glass according to claim 8, wherein said solvent is selected from the group consisting of chlorinated solvents, acetone, and tetrahydrofurane.

10. A window glass according to claim 3, wherein the polyol component comprises a long polyol and a short diol, said long polyol being selected from the group consisting of diols having a molecular weight of from about 400 to 4,000 g/mol, triols having a molecular weight of from 90 to 1,000 g/mol and mixtures thereof, and said short diol being selected from the group consisting of ethylene glycol, 1,2-propanediol, 1,3-propanediol, 1,2-butanediol, 1,3butanediol, 1,4-butanediol, 2,2-dimethyl-1,3-propanediol, 1,5-pentanediol, 1,6-hexanediol, 1,8-octanediol, 1,10decanediol, 1,12-dodecanediol, cyclohexane dimethanol, bisphenol A, 2-methyl-2,4-pentanediol, 3-methyl-2,4-pentanediol, 2-ethyl-1,3-hexanediol, 2,2,4-trimethyl-1,3-pentanediol, diethylene glycol, triethylene glycol, tetraethylene glycol, 2-butyne-1,4-diol, 1,4-butenediol and decyne diol, hydroquinonebishydroxyethyl ether, bisphenol A etherified by two groups of propylene oxide, bisphenol A etherified by four groups of propylene oxide, and dimethylol propionic acid.

* * * * *